March 10, 1964
C. N. BAKER ETAL
3,124,081
MEAT HOOK STABILIZER
Filed April 12, 1962
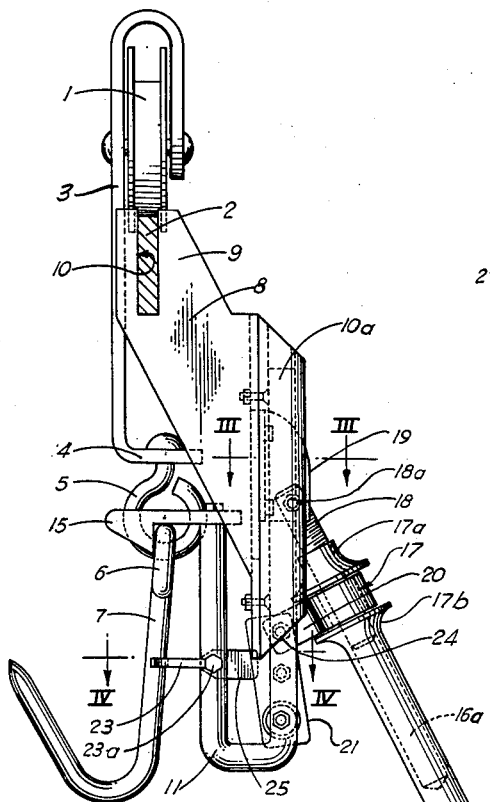
Fig. I
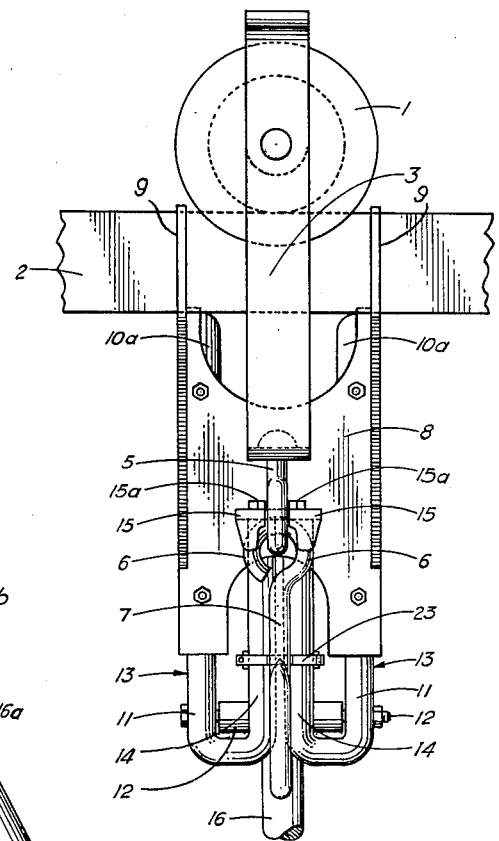
Fig. II
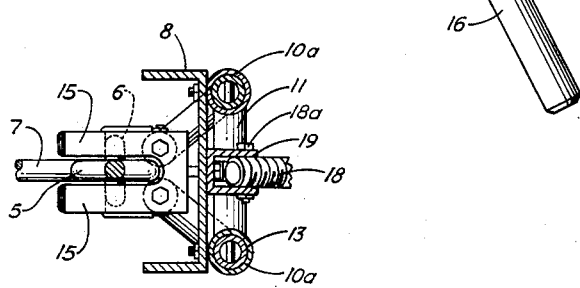
Fig. III
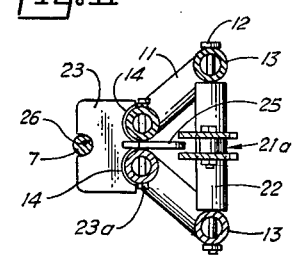
Fig. IV
INVENTORS
Charles N. Baker
Cecil H. Richards
BY
Howard E. Moore
ATTORNEY ବ୍ୟକ୍ତ
United States Patent Office 3,124,081
Patented Mar. 10, 1964

3,124,081
MEAT HOOK STABILIZER
Charles N. Baker, 5207 Regatta, and Cecil H. Richards, 3006 Rolinda Drive, both of Dallas, Tex.
Filed Apr. 12, 1962, Ser. No. 186,935
5 Claims. (Cl. 104—89)

This invention is concerned with a device for suspending meat carcasses in cold storage vaults so that they can be moved about. It is customary to suspend same on an eye hook pivotally attached to a bracket having a flanged wheel at the upper end thereof, which engages and runs upon a rail extending across the room.

A problem has been existent in this art for a long time, to-wit, in order to remove a carcass from an eye hook or place one thereon, it requires the services of two or more persons, one to hold the hook steady to keep it from rotating and pivoting laterally, while the other person or persons lift the carcass off or on to the hook. This not only results in a wastage of manpower, but is unsafe in that it often results in injuries to workers caused by dropping carcasses, or back strains due to shifting of weight thereof.

It is the primary object of this invention to provide an improved stabilizer device attachable between the suspending rail and the eye hook, for holding the hook against lateral and rotational movement, so that one person can lift the carcass off the hook or place the carcass thereon with maximum safety.

An embodiment of the invention is shown in the attached drawings, wherein:

FIGURE I is a side elevational view which shows the stabilizer device attached between the rail and the hook, being shown in latched position holding the hook rigid against lateral and rotational movement;

FIGURE II is a front end view of the stabilizer device taken from the left side of FIGURE I;

FIGURE III is a transverse, sectional view taken along the line III—III of FIGURE I; and FIGURE IV is a transverse sectional view taken along the line IV—IV of FIGURE I.

As shown in the drawing, a flanged wheel 1 is rotatably disposed on a longitudinal beam 2, on which a carcass is to be suspended and transportable. The wheel is rotatably secured to a bracket 3 which has a flange 4 on the lower end thereof, to which is rotatably attached an eye 5. The eye 6 of the hook 7 is pivotally attached within the eye 5. The hook and wheel assembly just described is the conventional type of suspending assembly used to suspend carcasses in a cold storage vault.

The stabilizer assembly includes a first frame member 8 having bifurcated arms 9 extending upwardly with aligned slots 10 therein arranged to receive the rail 2.

Spaced tubular elements 10a are attached to the outer face of the frame 8, and a second frame member, which as shown, is comprised of L-shaped members 11, which are secured together by a bolt 12 extending therethrough, have free cylindrical legs 13 thereon slidably disposed in the tubular members 10a.

Legs 14 on the members 11 extend upwardly and have a pair of hooks 15 extending outwardly therefrom, and attached thereto, by cap screws 15a. The space between said hooks 15 is arranged to receive the eye 5, with the eye 6 of hook 7 disposed behind the hooks 15.

An overcenter lever assembly is attached between the frame 8 and the members 11, the overcenter lever including a handle 16 rotatably extending through a sleeve 17 which is held thereon by flanges 17a and 17b. A threaded shaft 18 is pivotally attached at 18a to a bifurcated bracket 19 which is secured to the frame 8. The threaded shaft 18 extends into a threaded bore 16a in handle 16 so that by rotation of handle 16 the shaft 18 may be lengthened or shortened with relation to the handle. The sleeve 17 has an attachment lug 20 thereon, which is pivotally attached at 24 to one end of a bifurcated link 21. The other end of the link 21 is secured to the sleeve 22 which is rotatably disposed about the bolt 12 as indicated at 21a.

A bracket or support 23, having a slot 26 on the outer edge thereof, is secured to the legs 14 of the members 11 by means of a bolt 23a, said support having a lug 25 thereon which engages the link 21 to limit inward movement of the said link.

To use the hook stabilizer device, the slots 10 are placed about the rail 2, as shown in FIG. I, and the eye 5 is placed between hooks 15 with eye 6 of hook 7 behind the hooks 15. The hook 7 may or may not have a meat carcass suspended thereon. In any event the shank of hook 7 will be positioned in slot 26. At this point the lever handle 16 will be up from the position shown in FIG. I.

The handle 16 is depressed to the position shown in FIG. I which causes the members 11 to move downwardly away from the frame 8 as the cylindrical legs 13 slide downwardly in tubes 10a. Thereby the hooks 15 move downwardly with respect to frame 8 and places the hook 7 under tension by reason of downward force exerted against eye 6. This causes hook 7 to be securely held in slot 26, and eyes 6 and 5 are prevented from turning. Therefore, the hook 7 is rigidly held against lateral or rotational movement. Tension is also exerted between roller 1 and rail 2, preventing the roller from rolling on the rail or rotating laterally thereon. Therefore, the attendant may lift a carcass off the hook 7 or place a carcass thereon without difficulty and without the necessity of someone holding the hook to stabilize same against movement.

When handle 16 is pushed down, the pivot point 24 goes overcenter, locking same in the position shown in FIG. I, but it may be unlocked simply by lifting up on handle 16, and the stabilizer device may be disengaged and moved to another position to stabilize another roller and hook assembly as hereinbefore described.

The thrust of the overcenter lever may be varied to accommodate different sizes of eyes 5 and 6 by rotating the handle 16, thus threading the handle inwardly or outwardly on the threaded pin 18 and thereby lengthening or shortening the distance between pivot points 18a and 24.

Having described our invention, we claim:

1. In a device of the class described a first frame member having a slot in the upper end thereof arranged to embrace a rail; a second frame member slidably attached to the first frame member; an operating handle pivotally attached to the first frame member; link means pivotally connected between the operating handle and the second frame member; a bifurcated hook member extending outwardly from the second frame member arranged to receive an eye of a meat suspension device therebetween and the eye of a meat suspension hook therebehind; and a hook retainer member extending outwardly of the second frame member having a slot therein arranged to receive the shank of a meat suspension hook.

2. The combination called for in claim 1 wherein the link means includes a pivot point adapted to go overcenter in one position with reference to the pivotal connection between the handle and the first frame member.

3. The combination called for in claim 1 wherein the connection between the operating handle and first frame member includes a threaded bore in the handle; a threaded shaft pivotally attached to the first frame member and the handle being rotatably connected to the link means.

4. In a meat hook stabilizer, a first frame member having a slot therein arranged to embrace a roller suspension rail; a pair of tubular members attached to the outer surface of the first frame member; a second frame member including a substantially L-shaped member having a pair of legs thereon slidably disposed in the tubular members; a pair of spaced hook members attached to the second frame member and extending outwardly therefrom with the hooks thereon facing downwardly; a meat hook retainer member having a slot in the outer face thereof; an operating handle pivotally attached to the first frame member; a lug member rotatably attached about the handle; a link pivotally attached at one end to the lug member and rotatably attached at the other end to the second frame member; the pivotal connection between the lug and the link being arranged to go overcenter with reference to the pivotal connection between the handle and the first frame member when the handle is depressed.

5. The combination called for in claim 4 wherein the connection between the handle and the first frame member includes a threaded shaft pivotally attached to the first frame member and a threaded bore in the handle arranged to threadedly receive the shaft.

References Cited in the file of this patent

UNITED STATES PATENTS

| | | |
|---|---|---|
| 2,724,342 | Anderson et al. | Nov. 22, 1955 |
| 2,761,394 | Cantrell et al. | Sept. 4, 1956 |
| 2,907,280 | Carlson | Oct. 6, 1959 |
| 2,943,581 | Bendik | July 5, 1960 |